US010768052B2

(12) United States Patent
Umkehrer et al.

(10) Patent No.: US 10,768,052 B2
(45) Date of Patent: Sep. 8, 2020

(54) MULTIPOINT SENSOR FOR DETERMINING AN EXISTING TEMPERATURE PROFILE OF A MEDIUM, AND METHOD FOR PRODUCING SAME

(71) Applicant: Endress+Hauser Wetzer GmbH+Co. KG, Nesselwang (DE)

(72) Inventors: Alfred Umkehrer, Hopferau (DE); Luca Palma, Milan (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 262 days.

(21) Appl. No.: 16/063,536

(22) PCT Filed: Nov. 15, 2016

(86) PCT No.: PCT/EP2016/077772
§ 371 (c)(1),
(2) Date: Jun. 18, 2018

(87) PCT Pub. No.: WO2017/102223
PCT Pub. Date: Jun. 22, 2017

(65) Prior Publication Data
US 2019/0003894 A1    Jan. 3, 2019

(30) Foreign Application Priority Data
Dec. 18, 2015    (EP) .................................... 15201289

(51) Int. Cl.
*G01K 1/26* (2006.01)
*G01K 1/02* (2006.01)
G01K 13/00 (2006.01)

(52) U.S. Cl.
CPC ............. *G01K 1/026* (2013.01); *G01K 13/00* (2013.01); *G01K 2213/00* (2013.01)

(58) Field of Classification Search
CPC .......... G01K 13/02; G01K 13/00; G01K 1/12; G01K 2205/00; G01K 2213/00;
(Continued)

(56) References Cited

U.S. PATENT DOCUMENTS 4,075,036 A * 2/1978 Lysikov ................. G01K 1/026
136/212
4,410,756 A * 10/1983 Schwagerman ......... G01K 1/14
136/201

(Continued)

FOREIGN PATENT DOCUMENTS

CN         2821549 Y     9/2006
CN       201314845 Y     9/2009
(Continued)

OTHER PUBLICATIONS

Search Report for European Patent Application No. 15201289.4, European Patent Office, dated Jun. 3, 2016, 5 pp.
(Continued)

*Primary Examiner* — Gail Kaplan Verbitsky
(74) *Attorney, Agent, or Firm* — Mark A. Logan; Endress+Hauser (USA) Holding Inc.

(57) ABSTRACT

The invention relates to a multipoint sensor for determining a temperature profile of a medium and to a method for producing said multipoint sensor. The multipoint sensor includes a tubular sheath having a closed end region; at least two cylindrical spacers produced from a material having a high thermal conductivity and arranged in an axially-spaced manner in the interior of the sheath. Each spacer includes a recess for holding a temperature-sensitive component of an elongate temperature sensor. Each spacer, with the exception of the spacer closest to the closed end region, has through-bores for feeding through the elongate temperature sensors fastened to the preceding spacers. The number of through-bores of a spacer corresponds to the number of preceding (Continued)

spacers. A filling material, is arranged between the spacers and surrounds each of the elongate temperature sensors. The filling material has a lower thermal conductivity than the material of the spacers.

15 Claims, 1 Drawing Sheet

(58) Field of Classification Search
CPC ............ G01K 7/00; G01K 3/08; G01K 1/026; G01K 7/02; G01K 1/14; G01K 3/06; G01N 25/482
See application file for complete search history.

(56) References Cited

U.S. PATENT DOCUMENTS

| | | | | |
|---|---|---|---|---|
| 4,415,758 A | * | 11/1983 | Lacoste | G01T 3/006 |
| | | | | 136/232 |
| 4,423,629 A | * | 1/1984 | Ara | G01F 23/248 |
| | | | | 374/54 |
| 4,460,225 A | | 7/1984 | Moore et al. | |
| 4,741,209 A | * | 5/1988 | McCulloch | G01F 23/22 |
| | | | | 374/54 |
| 5,211,904 A | * | 5/1993 | Oosterkamp | G01F 23/22 |
| | | | | 141/95 |
| 6,599,011 B2 | * | 7/2003 | Daily | G01K 1/026 |
| | | | | 136/201 |
| 6,615,658 B2 | * | 9/2003 | Snelling | G01F 23/247 |
| | | | | 340/622 |
| 7,004,625 B2 | * | 2/2006 | Egidio | G01K 1/026 |
| | | | | 374/112 |
| 2015/0059469 A1 | * | 3/2015 | Batti | G01F 23/22 |
| | | | | 73/295 |

FOREIGN PATENT DOCUMENTS

| | | |
|---|---|---|
| CN | 102313611 A | 1/2012 |
| CN | 202420705 U | 9/2012 |
| CN | 202442804 U | 9/2012 |
| DE | 202011001277 U1 | 4/2012 |
| DE | 202014103008 U1 | 10/2014 |
| DE | 102013216256 A1 | 11/2014 |

OTHER PUBLICATIONS

Search Report for International Patent Application No. PCT/EP2016/077772, WIPO. dated Feb. 3, 10 pp.

* cited by examiner

MULTIPOINT SENSOR FOR DETERMINING AN EXISTING TEMPERATURE PROFILE OF A MEDIUM, AND METHOD FOR PRODUCING SAME

CROSS-REFERENCE TO RELATED APPLICATIONS

The present application is related to and claims the priority benefit of European Patent Application No. 15201289.4, filed on Dec. 18, 2015 and International Patent Application No. PCT/EP2016/077772 filed on Nov. 15, 2016, the entire contents of which are incorporated herein by reference.

TECHNICAL FIELD

The invention relates to a multipoint sensor for determining a temperature profile of a medium, which temperature profile consists of several measurement points. The invention further relates to a method for producing the multipoint sensor according to the invention.

BACKGROUND

Temperature sensors are often used in the field of automation technology, e.g., in order to sense the temperature of a medium in a pipeline and/or in a container, or in field devices, such as thermal flow-measuring devices for measuring the flow rate and/or the density of a medium in a pipeline. Temperature sensors comprise a temperature-sensitive component, e.g., a resistance thermometer or a thermal element, as well as cables, wherein these components are often inserted into a measuring tube. Corresponding temperature sensors and field devices are produced and marketed by the applicant. The underlying measurement principles of the temperature sensors and of the field devices are known from a multitude of publications.

Multipoint sensors for measuring temperature consist of a plurality of individual temperature sensors and allow for the simultaneous measurement of locally spaced-apart measurement points of a temperature profile of the medium.

In the industrial environment, high demands in terms of robustness, reliability, and measurement accuracy are imposed on the temperature sensors. For this purpose, the temperature sensors are often integrated into mineral-insulated lines—in particular, in applications with high temperatures, aggressive media, and/or high process pressures. Sheathed cables in which an element to be insulated—in this case, one or more temperature sensors—is completely surrounded by a ceramic insulating material are called mineral-insulated lines.

Mineral-insulated lines are generally produced by mechanical pultrusion processes, by means of which the desired shape of the line is formed after a series of deformation steps. Prior to the pultrusion process, the temperature sensors are inserted into ceramic blocks, which are crushed into a powder during the pultrusion process. This powder forms the insulating material and allows a bending of the mineral-insulated line up to a certain degree.

A disadvantage in this production method is that only mechanically robust, temperature-sensitive components, such as thermal elements, can be used. Less robust types of temperature-sensitive components, such as resistance thermometers, would be damaged as a result of the great forces that prevail during the pultrusion process.

A basic disadvantage of mineral-insulated lines also consists in the insulating material slowing down the heat flow from a process medium to the respective temperature sensor located in the line. A temperature change in the process medium is thus sensed with a time lag by the respective temperature sensor.

In the case of a multipoint sensor, in which several temperature sensors are located in the mineral-insulated line, a locally-precise sensing of the individual measurement points of a temperature profile is, moreover, difficult, due to the insulating material surrounding the temperature sensors.

SUMMARY

The invention is based upon the aim of providing a multipoint sensor that allows a precise sensing of a temperature profile and a simple method for its production.

The invention is achieved by a multipoint sensor for determining a temperature profile of a medium, which temperature profile consists of several measurement points, consisting of a tubular sheath having a closed end region;
n cylindrical spacers with n>1, n∈ℕ, which are produced from a material having a high thermal conductivity,
wherein the outside diameter of each spacer substantially corresponds to the inside diameter of the sheath,
wherein the spacers are arranged one behind the other in an axially-spaced manner in the interior of the sheath,
wherein each spacer contains a recess for respectively holding a temperature-sensitive component of an elongate temperature sensor, whereby a measurement point of the temperature profile is sensed in each case,
wherein each spacer, with the exception of the spacer located closest to the closed end region, has through-bores for feeding through the elongate temperature sensors fastened to the preceding spacers,
wherein exactly one elongate temperature sensor is fed through a through-bore, so that the number of through-bores of a spacer corresponds to the number of preceding spacers; and
a filling material, which is arranged between the spacers and which surrounds each of the elongate temperature sensors, wherein the filling material has a lower thermal conductivity than the material of the spacers.

The advantage of the multipoint sensor according to the invention lies in being able to sense a locally-precise temperature profile of a medium. Because the material of the spacers has a higher thermal conductivity than the filling material located between the spacers, the temperature prevailing directly at a measurement point is sensed very precisely.

The spacers not only ensure a good heat transfer, but also facilitate positioning of the temperature sensors in the sheath.

Contrary to the mineral-insulated conductors known in the prior art, which are described in the introductory part of the description, both thermal elements as well as less mechanically-robust, temperature-sensitive components, such as resistance thermometers, can be used in the multipoint sensor according to the invention.

The multipoint sensor according to the invention can be used in a plurality of applications. For example, the multipoint sensor is used in a container filled with a medium, in a pipeline, or in another application mentioned in the introductory part of the description.

A first variant of the multipoint sensor according to the invention provides that the filling material be additionally arranged between the closed end region of the sheath and the spacer located closest to the closed end region. In this way, the spacer located closest to the closed end region of the sheath, and thus the first measurement point of the temperature profile, can be arranged at a distance from the closed end region. This can, for example, then be necessary, if the closed end region is mechanically fastened, and the medium therefore does not flow around it.

Another variant of the multipoint sensor according to the invention provides that the spacer located closest to the closed end region be positioned directly at the closed end region. In this way, a first measurement point of the temperature profile can be sensed directly at the height of the closed end region of the sheath. The direct contact with the mostly metallic material of the end region, moreover, makes good heat transfer possible.

In a preferred embodiment of the multipoint sensor according to the invention, the spacers are produced from a thermally-conductive ceramic material. The multipoint sensor can be used over a high temperature range, since ceramics have a low coefficient of thermal expansion in comparison to metallic material.

A particularly preferred embodiment of the multipoint sensor according to the invention provides that the thermally-conductive ceramic material be boron nitride. Boron nitride—specifically, hexagonal boron nitride with a calcium borate portion—has a very high thermal conductivity in comparison to most other common ceramics.

An advantageous development of the multipoint sensor according to the invention provides that the filling material be a powder. The use of a powder as filling material allows for bending the multipoint sensor. The powder moreover prevents air layers between the spacers and improves the mechanical stability of the multipoint sensor.

A preferred development of the multipoint sensor according to the invention provides that the powder consist of a ceramic material. Most common ceramic materials have a high dielectric strength. The temperature sensors are electrically insulated from each other as a result.

A particularly preferred development of the multipoint sensor according to the invention provides that the powder consist of aluminum oxide. In contrast to the most commonly-used cables and sensors, which are insulated with a ceramic material and which use magnesium oxide as filling material, aluminum oxide can be used as a fine granulate. Powdered magnesium oxide, on the other hand, would form clumps. Alternatively, hafnium oxide may be used as filling material.

An advantageous embodiment of the multipoint sensor according to the invention provides that the sheath be produced from a solid, bendable material, which allows bending of the multipoint sensor. A thin, metallic material is preferably used. In addition to high bendability, a metallic material offers good protection of the multipoint sensor against aggressive measurement media. Stainless steels of the types, AISI 316, AISI 316L, AISI 316Ti, AISI 321, or AISI 347, can, for example, be used as metallic material. The alloys, Inconel600 or Hastelloy X, can, alternatively, be used.

The invention is, moreover, achieved by a method for producing the multipoint sensor according to the invention, comprising the following steps:

Successive positioning and fastening of the temperature-sensitive component of the elongate temperature sensors in the respective recess of the spacer elements;
Successive insertion of the spacers into the sheath such that, with the exception of the spacer located closest to the closed end region, exactly one elongate temperature sensor is fed through each of the through-bores;
Successive filling of the filling material between two spacers that succeed one another, so that the filling material surrounds each of the elongate temperature sensors; and
Closing of the sheath at its open end region opposite the closed end region.

The advantage of the method according to the invention lies in no pultrusion process being used during the production process of the multipoint sensor. As a result, more sensitive sensor components, such as resistance thermometers, can also be used, in addition to thermal elements.

A preferred embodiment of the method according to the invention provides that, in the case where the filling material is a powder, the multipoint sensor be shaken during the filling and/or after each filling of the powder. On the one hand, the filling material is compacted thereby; on the other hand, air pockets produced during the filling are filled.

An advantageous development of the method according to the invention provides that the fastening of the respective temperature-sensitive component of an elongate temperature sensor in the respective recess of a spacer take place by means of an adhesive—in particular, by means of a thermally-conductive ceramic adhesive. The ceramic adhesive is preferably cement or a ceramic paste based upon silicon dioxide.

A particularly advantageous embodiment of the method according to the invention provides that the filling of the filling material take place using a capillary tube. The filling of the preferably powdered filling material by means of a capillary tube takes place precisely and in a controlled manner; air pockets are thereby prevented.

A first variant of the method according to the invention provides that the filling material be additionally filled in between the closed end region of the sheath and the spacer located closest to the closed end region. In this way, the spacer located closest to the closed end region of the sheath, and thus the first measurement point of the temperature profile, can be arranged at a distance from the closed end region. This can, for example, be necessary if the closed end region is mechanically fastened, and the medium therefore does not flow around it.

Another variant of the method according to the invention provides that the spacer located closest to the closed end region be positioned directly on the closed end region. In this way, a first measurement point of the temperature profile can be sensed directly at the height of the closed end region of the sheath. The direct contact with the mostly metallic material of the end region, moreover, makes good heat transfer possible.

BRIEF DESCRIPTION OF THE DRAWINGS

The invention is explained in greater detail with reference to the following FIGS. 1 and 2. Shown are.

DETAILED DESCRIPTION

Figure 1:
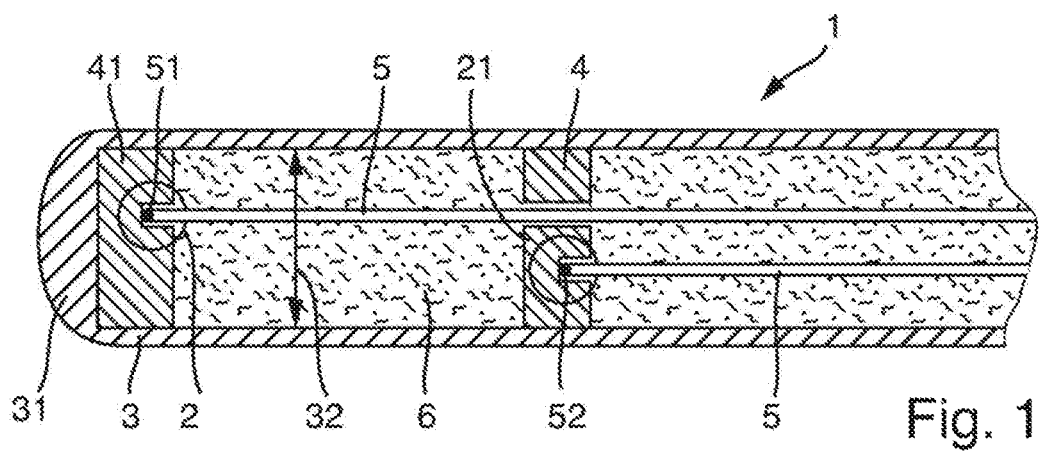
FIG. 1 shows an exemplary embodiment of a multipoint sensor according to the invention.

FIG. 1 shows an exemplary embodiment of a multipoint sensor 1 according to the invention. The multipoint sensor 1 consists of a tubular sheath 3, which is preferably produced from a metallic material and has a closed end region 31. In the original state, the end region opposite the closed end region 31 is open.

The multipoint sensor 1, moreover, has at least two cylindrical spacers 41, 4. In the exemplary embodiment shown in FIG. 1, exactly two spacers 41, 4 are used. Each of the spacers 4, 41 has a recess 43, in which a temperature-sensitive component 51, 52 of an elongate temperature sensor 5 is respectively fastened, which respectively senses one measurement point 2 of a temperature profile of a medium. The temperature-sensitive component 51, 52 can, for example, be a resistance thermometer or a thermal element.

The spacers 4, 41 are produced from a material having a high thermal conductivity—preferably, from a ceramic material such as boron nitride. Hexagonal boron nitride, which additionally contains a proportion of calcium borate, has very high thermal conductivity in comparison to common ceramics. The outside diameter 42 of the spacers 4, 41 substantially corresponds in this case to the inside diameter 32 of the sheath 3, as a result of which the spacers 4, 41 are in contact with the sheath 3. As a result of this contact and the high thermal conductivity of the spacers 4, 41, the temperature of the medium prevailing directly at the measurement point 2 is sensed by the respective temperature-sensitive component 51, 52. Because the ceramic materials have a comparatively low coefficient of thermal expansion, this contact persists over a large temperature range.

A filling material 6 is located between the spacers 4, 41. This filling material is preferably designed as a powder and consists of a ceramic material—preferably, aluminum oxide or hafnium dioxide. The filling material 6 has a lower thermal conductivity than the material of the spacers 4, 41. This ensures that the temperature prevailing directly at a measurement point 2 is sensed very precisely.

In order to produce the multipoint sensor 1 according to the invention, the temperature-sensitive component 51 of a first elongate temperature sensor 5 is first inserted into the recess 43 of a first spacer 41 and positioned. Using an adhesive—preferably, a ceramic, thermally-conductive adhesive, such as cement, or a ceramic paste based upon silicon dioxide—the temperature-sensitive component 51 is fastened in the recess 43.

The first spacer 41 is subsequently inserted through the open end region into the sheath 3 and positioned. The first spacer 41 can, in this case, be positioned at a distance from the closed end region 31 of the sheath 3 or be brought into contact with it.

In the next step, the preferably powdered filling material 6 is filled into the sheath 3 and forms a first layer above the first spacer 41. The filling of the filling material 6 takes place in this case via a capillary tube, through which the filling material 6 is pumped. Alternatively, several inlets through which the filling material 6 is filled in are located on the surface of the sheath 3. After filling of the filling material 6, said inlets must, however, be closed—for example, by means of a welding process. After filling of the filling material 6, the multipoint sensor 1 is shaken, in order to achieve compaction and a good distribution of the filling material 6. If the first spacer 41 is positioned at a distance from the closed end region 31 of the sheath 3, a layer of the filling material 6 is filled in before inserting the first spacer 41.

A second spacer 4 with a fastened temperature-sensitive component 52 of a second elongate temperature sensor is subsequently inserted into the sheath 3. As a result of the first layer of the filling material 6, this second spacer is positioned at a distance from the first spacer 41. The second spacer 4 has a through-bore, through which the rod-shaped temperature sensor 5 of the first spacer 41 is fed.

A second layer of the filling material 6 is subsequently filled into the sheath 3. The exemplary embodiment shown in FIG. 1 is limited to two spacers 4, 41. The multipoint sensor according to the invention is, however, not limited to two spacers 4, 41, but allows the use of a plurality of additional spacers, which are positioned in the pipe according to the method described. The number of through-bores 44 of a spacer 4 in this case always corresponds to the number of preceding spacers 41.

In the final method step, the sheath 3 is closed at its open end region opposite the closed end region 31. For example, a cover sleeve is welded on, through which the cables for contacting the elongate temperature sensors 5 are fed. Prior to attaching this cover sleeve, it can be provided for further compaction of the filling material 6, by means of slight axial pressure in the direction of the closed end region 31, to be achieved. It can, lastly, be provided for this end region to be sealed, using a resin.

Figure 2A:
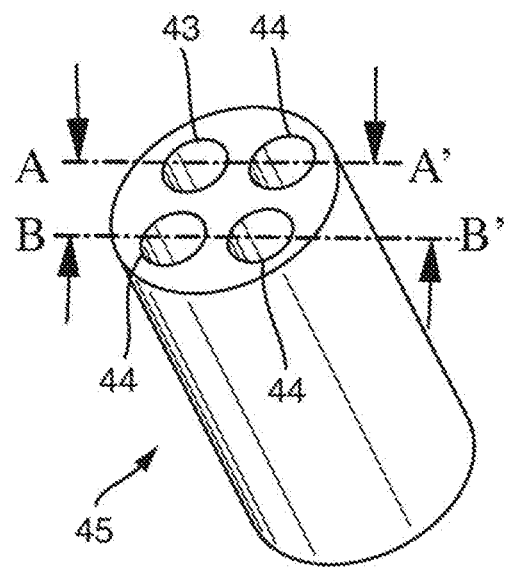
FIG. 2 shows an embodiment of a spacer of the multipoint sensor according to the invention.
Figure 2B:
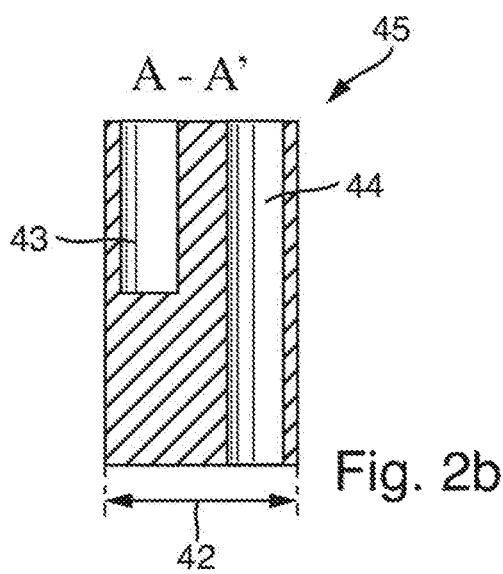
Figure 2C:
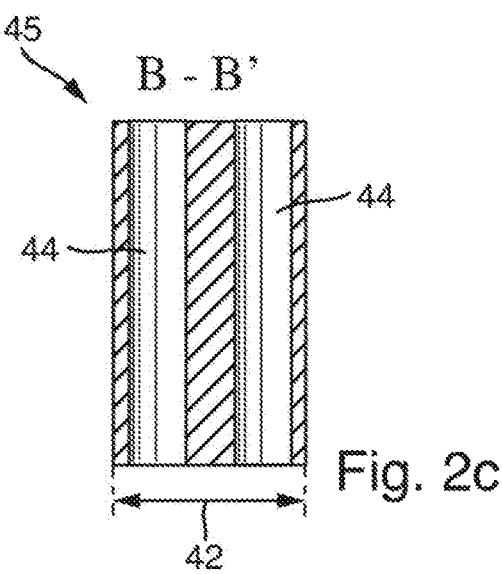

FIG. 2 shows an embodiment of a spacer 45 of the multipoint sensor 1 according to the invention. FIG. 2a) in this case shows a perspective view of spacer 45; FIGS. 2b) and 2c) respectively show a cross-section of spacer 45. The spacer 45 has a recess 43 for holding and positioning a temperature-sensitive component 51, 52 of an elongate temperature sensor 5, as well as three through-bores 44 for feeding through the elongate temperature sensors of the preceding spacer 41.

In this exemplary embodiment, shown in FIG. 2, three additional spacers (not shown) are located between the spacer 45 and the closed end region 31 of the sheath 3. One elongate temperature sensor 5, respectively, is also fastened to each of these three additional spacers. The three elongate temperature sensors 5 of the three spacers are fed through the through-bores 44 of the spacer 45.

The multipoint sensor 1 according to the invention can be used in a plurality of applications. For example, the multipoint sensor 1 is used in a container filled with a medium, in a pipeline, or in another application mentioned in the introductory part of the description.

The temperature sensor 1 according to the invention is also not limited to the embodiments and examples described.

The invention claimed is:

1. A multipoint sensor for determining a temperature profile of a medium, which temperature profile consists of several measurement points, comprising:
   a tubular sheath having a closed end region;
   at least two elongate temperature sensors, each elongate temperature sensor having a temperature-sensitive component;
   at least two cylindrical spacers produced from a material having a high thermal conductivity,
   wherein an outside diameter of each spacer substantially corresponds to an inside diameter of the sheath,
   wherein the spacers are arranged one behind the other in an axially-spaced manner in the interior of the sheath,
   wherein each spacer contains a recess for holding a temperature-sensitive component of an elongate temperature sensor, whereby a measurement point of the temperature profile is sensed in each case,
   wherein each spacer, with the exception of the spacer located closest to the closed end region, has through-bores for feeding through the elongate temperature sensors fastened to the preceding spacer, wherein exactly one elongate temperature sensor is fed through a through-bore so that the number of through-bores of a spacer corresponds to the number of preceding spacers; and a filling material, which is arranged inside the sheath and between the spacers and which surrounds each of the elongate temperature sensors, wherein the filling material has a lower thermal conductivity than the material of the spacers.

2. The multipoint sensor according to claim 1, wherein the filling material is additionally arranged between the closed end region of the sheath and the spacer located closest to the closed end region.

3. The multipoint sensor according to claim 1, wherein the spacer located closest to the closed end region is positioned directly on the closed end region.

4. The multipoint sensor according to claim 1, wherein the spacers are produced from a thermally-conductive ceramic material.

5. The multipoint sensor according to claim 4, wherein the thermally-conductive ceramic material is boron nitride.

6. The multipoint sensor according to claim 1, wherein the filling material is a powder.

7. The multipoint sensor according to claim 6, wherein the powder includes a ceramic material.

8. The multipoint sensor according to claim 6, wherein the powder includes aluminum oxide.

9. The multipoint sensor according to claim 1, wherein the sheath is produced from a solid, bendable material.

10. A method for producing a multipoint sensor, comprising:

providing a sheath having a closed end region;

providing at least two spacers, each spacer having a recess and at least one through-bore;

providing at least two elongate temperature sensors, each elongate temperature sensor having a temperature-sensitive component;

positioning and fastening the temperature-sensitive component of an elongate temperature sensor in the recess of a spacer;

inserting the spacer with the temperature-sensitive component into the sheath and feeding a previously-inserted elongate temperature sensor though a through-bore in the spacer such that, with the exception of a spacer located closest to the closed end region, exactly one elongate temperature sensor is fed through a through-bore;

filling a filling material between two spacers that succeed one another, so that the filling material surrounds each of the elongate temperature sensors; and closing of the sheath at an open end region opposite the closed end region.

11. The method according to claim 10, wherein the filling material is a powder, the method further comprising:

shaking the multipoint sensor during the filling and/or after each filling of the powder.

12. The method according to claim 10, wherein the fastening of the temperature-sensitive component of an elongate temperature sensor in the recess of a spacer uses a thermally-conductive ceramic adhesive.

13. The method according to claim 10, wherein the filling of the filling material takes place using a capillary tube.

14. The method according to claim 10, wherein the filling material is additionally filled in between the closed end region of the sheath and the spacer located closest to the closed end region.

15. The method according to claim 10, wherein the spacer located closest to the closed end region is positioned directly on the closed end region.

* * * * *